March 23, 1971  W. B. IGOE  3,572,112
DYNAMIC VIBRATION ABSORBER

Filed June 30, 1969  2 Sheets-Sheet 1

INVENTOR.
WILLIAM B. IGOE
BY
ATTORNEYS

March 23, 1971 W. B. IGOE 3,572,112
DYNAMIC VIBRATION ABSORBER

Filed June 30, 1969 2 Sheets-Sheet 2

INVENTOR.
WILLIAM B. IGOE
BY
ATTORNEYS

United States Patent Office 3,572,112
Patented Mar. 23, 1971

3,572,112
DYNAMIC VIBRATION ABSORBER
William B. Igoe, Newport News, Va., assignor to the United States of America as represented by the Administrator of the National Aeronautics and Space Administration
Filed June 30, 1969, Ser. No. 837,825
Int. Cl. G01m 9/00
U.S. Cl. 73—147
10 Claims

ABSTRACT OF THE DISCLOSURE

A tuned damped vibration absorber for a mass vibrating in more than one degree freedom of motion. It consists of a cantilever spring and attached mass designed so that they will absorb vibrations simultaneously at different frequencies in corresponding different degrees of motion.

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

This invention relates to a tuned, damped vibration absorber which is particularly adapted for use in absorbing the vibrations in a body that vibrates in several degrees of motion simultaneously at different frequencies in the different degrees of motion. The present invention has specific application to absorbing vibrations of an aircraft model mounted on a sting in a wind tunnel, the model being subjected to the airstream in the wind tunnel which can cause severe vibrations of the model in both the pitch and yaw direction. Usually, the frequency of vibration in the pitch and yaw direction are quite different, requiring a multi-purpose absorber to provide proper alleviation of vibration.

Various prior art techniques have been utilized for reducing the amplitude of vibration in a body. These techniques include mechanism for shock isolation, damping, mass balancing, and vibration absorption. Shock isolation methods are useful where it is possible to reduce the frequency of vibratory response far below the frequency of excitation and where large displacement of the system to be shock isolated can be tolerated. Normally such a system would not be useful for damping vibrations of a wind tunnel model, since large displacement of the model can not be allowed. This is true, because of the force balance measuring system which is usually associated with wind tunnel testing, this measuring system not operating properly or accurately, when large displacement of the model occurs.

Dampers are useful whenever parallel force linkage are permissible or possible between the vibrating system and the reference system with respect to which the vibrations are to be reduced. Again, this type of system is not usually useful in wind tunnel testing because the models are usually very small prohibiting the use of the necessary linkages.

The proper placement of mass to provide balancing is generally not useful since the model vibration as a rule is not caused by mass unbalance.

In view of the discussion above, it can be seen that vibration absorbers are the type of mechanism which is usually utilized for the elimination of vibration in a body such as an aircraft model. There are two common vibration absorbers which are normally utilized including the Frahm tuned vibration absorbers and the Lanchester dampers. Existing Frahm type tuned vibration absorbers are of the form which are applicable only to a single degree of motion. Thus, such a vibration absorber will not alleviate the problems in both pitch and yaw in an aircraft model, unless multiple absorbers are utilized. The use of multiple absorbers, obviously and additional mass to the system as well as take up much needed room and are therefore not useable in many models. The Lanchester type of damper provides for multiple modes of vibration absorption, but are not tuned absorbers. Since tuning greatly enhances the vibration absorbing characteristics of the mechanism, this type of damper is not particularly effective as a vibration absorber.

SUMMARY OF THE INVENTION

The present invention overcomes the above-mentioned difficulties by providing an arrangement wherein the vibration absorber is tuned and simultaneously absorbs vibrations of differeing frequency in at least two degrees freedom of motion. The basic components of the invention are a cantilever spring which is fixed to the body whose vibrations are to be absorbed, and a mass carried by the cantilever spring. The multiple mode absorption is accomplished by design of the cantilever spring cross section. Tuning is provided by varying the spring length and by positioning of the mass along the cantilever spring. The inventive concept can also be accomplished by utilizing multiple cantilever or other springs with a common mass, or by using a single cantilever spring and disposing the mass at various points along the spring. The invention also encompasses the idea of various shaped masses which can be utilized with a cantilever spring, this arrangement providing use of the invention with most any shape of body to be damped. The use of a single cantilever spring and mass to provide a multiple mode absorption also provides for a vibration absorber which is light in weight and small physical size making it particularly adaptable for absorbing the vibrations of small masses.

DESCRIPTION OF THE PREFERRED EMBODIMENT

Figure 1:
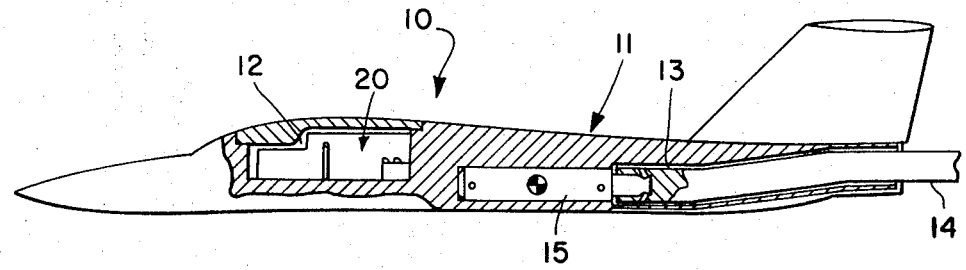
FIG. 1 is a cross sectional view of an aircraft model as it would be mounted in a wind tunnel, showing the location of the invention vibration absorber installed in such a model.

Referring now more specifically to the details of the invention, FIG. 1 shows the absorber assembly, designated generally by the reference numeral 10.

Included in the assembly is a mass 11 which in FIG. 1 takes the form of an aircraft model. The body or mass 11 has a cavity 12 which is designed to receive the vibration absorber 20 to be explained more fully hereinafter. The body 11 also has a support aperture 13 which receives the sting 14 of a conventional wind tunnel support system. The aperture 13 also accommodates a balance 15 which is tied into the support 14. The balance 15 is associated with the body 11 in a manner such that forces applied to the body are detected by the balance and transmitted to recording equipment in a conventional manner.

Figure 2:
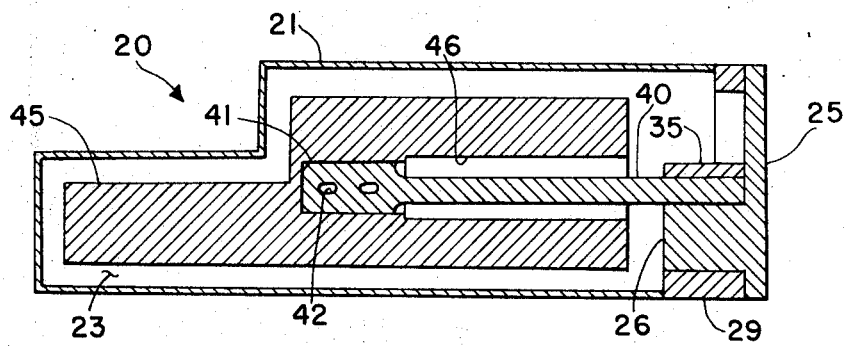
FIG. 2 is a cross sectional view of the vibration absorber showing a side elevational section of the absorber.
Figure 3:
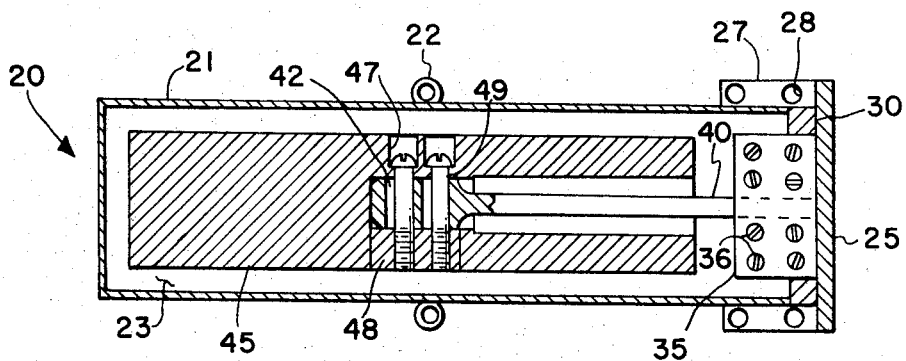
FIG. 3 is a cross sectional view of the vibration absorber showing a plan sectional view of the absorber.

The detailed construction of the vibration absorber 20 is best illustrated in FIGS. 2 and 3. The absorber includes a housing 21 which is usually constructed from some metallic material which is easily weldable or solderable to other metallic members or can be fastened with threaded fasteners. The housing as shown in FIG. 2 is generally rectangular in shape and has a stepped configuration when viewed from the side. Fastener guides 22 are secured to or formed integral with the housing 21 and provide a means for receiving a threaded fastener, adapted to engage the threaded opening in the body 11. The position of the guide 22 can be seen in FIG. 1 and the manner in which the fastener engages the guide and the body is believed to be apparent. The housing is filled with a viscous damping liquid, such as silicone oil.

A back plate 25 having a generally T-shaped configuration operates as a support for the vibration absorbing mechanism. The support leg 26 thereof operates as a platform to which the cantilever spring is fastened in a manner to be described more fully herinafter. End plates 27 are secured along the side edges by welding or machined from the back plate 25 as shown in FIG.3. The end plates have fastener openings 28 which also receive threaded fasteners that engage the body 11 in a manner best shown in FIG. 1.

A base 29 is formed integral with the housing 21 and provides a filler between the support leg 26 and the model. Positioning ribs 30 are also formed integral with the housing 21 and are located between the end plates 27 and the support leg 26 to assist in properly locating the cantilever spring clamping block in a manner now to be described.

A clamping block 35 which receives fasteners 36 therethrough, that engage the support leg 26, clamps in place the cantilever spring 40 which projects from the support leg 26 in a cantilever manner as shown in FIGS. 2 and 3. The cantilever spring 40 has a generally rectangular cross section and a cylindrical head 41. The head 41 has elongated slots 42 formed therethrough for receiving fasteners which secure the mass to the spring.

The mass 45 has an aperture 46 which allows the cantilever spring to be inserted in the aperture. The innermost portion of the aperture 46 is machined so as to allow a sliding fit with the cantilever spring head 41, and the remainder of the aperture 46 is machined to provide clearance between the mass and the spring. Fastener holes 47 are formed in the mass 45 to receive threaded fasteners 49. A nut block 48 is positioned in the mass 45 and has threaded apertures which receive the fasteners 49. As shown in FIG. 3, the fasteners pass through the spring head 41 and engage the nut block 48 to connect together the cantilever spring 40 and the mass 45.

Figure 4:
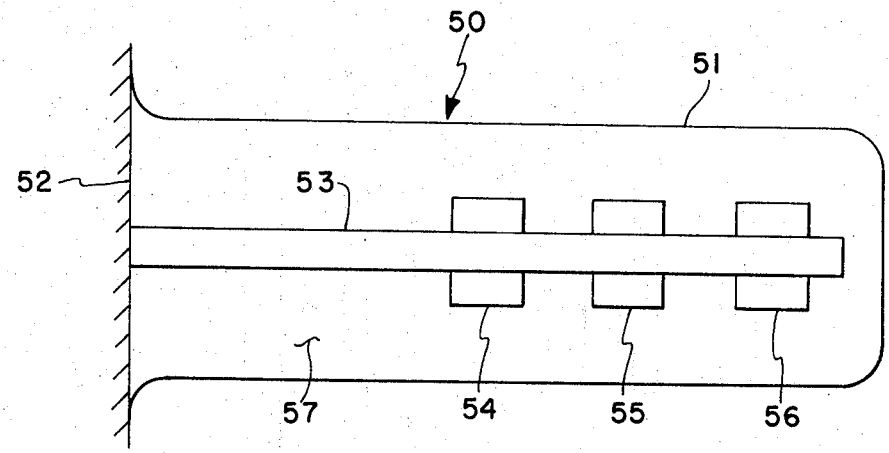
FIG. 4 is a cross sectional view of a modified form of the vibration absorber showing a side elevational view of a section wherein different masses are disposed along the cantilever spring.

FIG. 4 shows a modified form of the vibration absorber designated generally by the reference numeral 50.

The vibration absorber 50 has a housing 51 which is attached to a fixed member 52. The cantilever spring 53 is also supported by the fixed support member 52 and extends therefrom and into the housing. In this arrangement, there are several masses disposed at points along the length of the cantilever spring. The first mass 54 is closest to the support structure, the second mass 55 is intermediate the third mass 56 which is located adjacent the end of the cantilever spring. The housing is filled with a viscous damping liquid 57.

Figure 5:
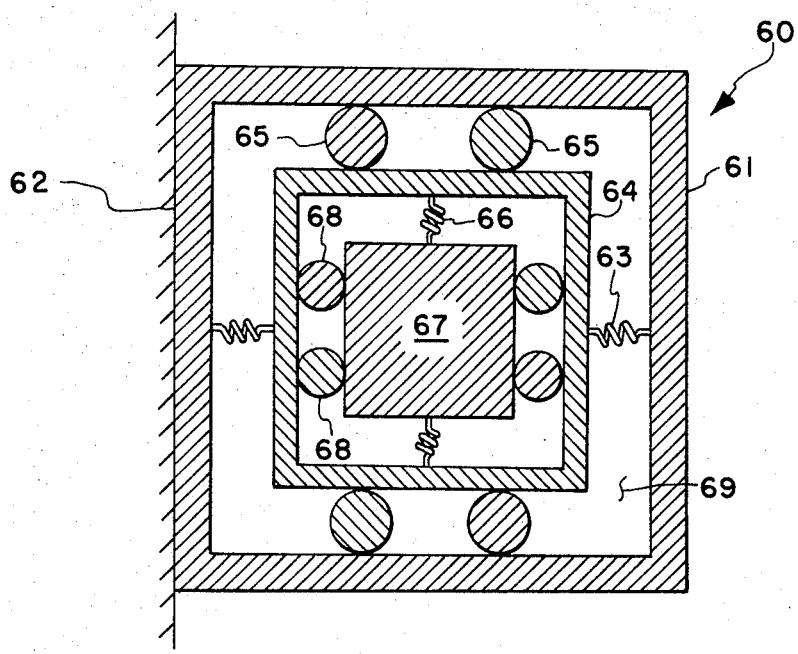
FIG. 5 is a cross section of the vibration absorber showing a plan view section of a modified arrangement having multiple springs associated with a common mass.

Still another embodiment of the invention is shown in FIG. 5, the vibration absorber therein being designated by the reference numeral 60.

The vibration absorber 60 has a housing 61 which is attached to a fixed support member 62. A pair of springs 63 are fixed to the housing and to a frame 64. Guides 65 restrain the frame to move parallel to the axis of the springs 63. Another pair of springs 66 are fixed to a frame 64 and to the common mass 67, and the mass is restrained within the frame to move parallel to the axis of the springs 66 by guides 68. The guides 65 and 68 may be roller confined by cage structure (not shown) or other conventional guide mechanism. The housing may be filled with a viscous damping liquid 69. In this arrangement, one of the pairs of springs is tuned to absorb vibrations in one direction at one frequency, and the other pair of springs is tuned to another frequency in the other direction.

OPERATION

In order to properly absorb vibration of a dynamic model system such as shown in FIG. 1, it is necessary to determine the several significant modes of vibration of the model. For such systems, the vibration absorber can be attuned to reduce the response in a particular mode of vibration, and the admittance of the system is thus correspondingly modified. The admittance of a dynamic system such as shown in FIG. 1, is the response of the system to a harmonic excitation of constant unit amplitude as a function of frequency. The performance characteristics of a vibration absorber in combination with a dynamic system having one or more degrees of freedom or normal modes of response and being subjected to a stationary random excitation may be obtained by means of techniques of generalized harmonic analysis. Once the admittance has been determined, it is possible to design the vibration absorber for the particular dynamic mass whose vibrations are to be absorbed.

With the instant invention, analysis and tests were made to determine what vibration modes were most responsible for vibrations of the model in both the pitch and yaw degrees of motion. The vibration absorber 20 was then tuned by varying the cross sectional dimension of the cantilever spring until the same ratio as the desired pitch and yaw frequencies was obtained. This particular design provided an arrangement whereby specific frequencies were obtainable in both the pitch and yaw planes simultaneously. This type of tuning can also be accomplished by varying the size and location of the mass. The arrangement shown in FIG. 4 shows the mass disposed at different points along the cantilever spring which will provide multiple mode frequency absorption. Likewise, the multiple spring arrangement shown in FIG. 5, wherein the stiffness of the springs 63 and 66 may be varied, will also produce multiple mode vibration absorption. It should also be noted in FIG. 2, that the elongated fastener receiving openings in the cantilever spring 41 will allow shifting of the mass 45 to enable tuning of the device. Also, the effective length of the cantilever spring can be varied by releasing the clamping block 25 and adjusting the spring with respect to the support leg 26 thereby accomplishing tuning.

With the vibration absorber 20 properly designed and constructed to operate in the known pitch and yaw frequencies of the model, the portion in the canopy area of the model is removed and the vibration absorber inserted in a cavity formed in the model. The vibration absorber 20 is fastened with threaded fasteners directly to the model, and the section of the model replaced. As can be seen in FIG. 1, the mass 45 may take various configurations, and has a stepped configuration, as illustrated, to accommodate its insertion in the model being tested. In actual wind tunnel tests, it was found that the amplitude of the model vibration was reduced as much as 50% in at least one of the degrees of motion of the model, and was reduced significantly in another degree of motion.

I claim:
1. A tuned damped vibration absorber comprising:
    a body to be damped normally mounted to move in at least two degrees of motion;
    spring means fixed to said body to be damped;
    a mass fastened to said spring means; and
    means for tuning the spring means and mass whereby vibrations are absorbed simultaneously at different frequencies in at least two corresponding degrees of motion.

2. A tuned damped vibration absorber as in claim 1 wherein said tuning means is the cross-sectional configuration of said spring means.

3. A tuned damped vibration absorber as in claim 1 wherein said tuning means is the cross-sectional configuration of said spring means and the length of the spring means; said spring means being a cantilever spring.

4. A tuned damped vibration absorber as in claim 1 wherein said tuning means is the position of the mass on said spring means.

5. A tuned damped vibration absorber as in claim 1 wherein said tuning means is the cross-sectional configuration of the spring means and the position of said mass thereon; said spring means being a cantilever spring.

6. A tuned damped vibration absorber as in claim 1 wherein said tuning means is the disposition of multiple masses on said spring means.

7. A tuned damped vibration absorber as in claim 1 wherein said tuning means is a plurality of spring means associated with a mass.

8. A tuned damped vibration absorber as in claim 1 wherein said spring means and mass are enclosed in a housing; said housing being filled with a viscous fluid to damp movement of said cantilever spring and mass.

9. A tuned damped vibration absorber as in claim 1 wherein said mass is a model of an aircraft; said model being mounted in a wind tunnel and subjected to turbulence and buffeting caused by the airstream in the tunnel; spring means being a cantilever spring fixed to said model; and said cantilever spring and mass being tuned to absorb simultaneously vibrations of the model in the pitch and yaw direction.

10. A tuned damped vibration absorber as in claim 9 wherein said cantilever spring and mass are enclosed in a housing; said housing being filled with a viscous fluid to damp movement of said cantilever spring and mass; and said housing and mass being shaped generally to the contour of the model to allow location in the model.

References Cited

UNITED STATES PATENTS

| | | | |
|---|---|---|---|
| 2,241,837 | 5/1941 | Williams et al. | 188—1(B) |
| 2,514,140 | 7/1950 | O'Connor | 188—1(B) |
| 2,736,393 | 2/1956 | O'Connor | 188—1(B) |
| 2,838,137 | 6/1958 | Wallerstein | 188—1(B) |
| 2,854,100 | 9/1958 | Bowser | 188—103 |
| 2,885,891 | 5/1959 | Wilson et al. | 73—147 |
| 1,997,423 | 4/1935 | Loser | 188—103X |
| 3,259,212 | 5/1966 | Nishioka et al. | 188—1B |

S. CLEMENT SWISHER, Primary Examiner

U.S. Cl. X.R.

188—103